United States Patent
Kim

Patent Number: 6,147,616
Date of Patent: Nov. 14, 2000

[54] AUTOMATIC POWER INTERRUPTION AND RE-SUPPLY RELAY FOR AN ELECTRIC POWER LINE

[76] Inventor: Myung Dong Kim, 5-202, Chumil Mansion, 555 Shingi-Dong, Dong-ku, Daeku, Rep. of Korea

[21] Appl. No.: 09/274,635

[22] Filed: Mar. 23, 1999

[30] Foreign Application Priority Data

Mar. 24, 1998 [KR] Rep. of Korea .................. 98-10126

[51] Int. Cl.[7] .................................................. G08B 21/00
[52] U.S. Cl. ..................... 340/657; 340/635; 340/645; 340/658; 340/660; 340/661; 361/59; 361/61; 361/71; 361/76; 361/77; 324/107; 324/108
[58] Field of Search ........................ 340/635, 645, 340/646, 657, 658, 660, 664; 361/59, 61, 71, 76, 77; 324/107, 108

[56] References Cited

U.S. PATENT DOCUMENTS

| | | | |
|---|---|---|---|
| 4,223,365 | 9/1980 | Moran | 361/71 |
| 4,333,119 | 6/1982 | Schoenmeyr | 361/76 |
| 5,946,174 | 8/1999 | Kaiser | 361/47 |
| 5,959,537 | 9/1999 | Banting et al. | 340/664 |

*Primary Examiner*—Julie Lieu
*Attorney, Agent, or Firm*—John P. White; Cooper & Dunham LLP

[57] ABSTRACT

The present invention provides a digital automatic power interruption and re-supply relay for performing detection and comparing operation to inform a state of an accident with voice and numerals and automatically operating a connected relay to interrupt power when there occur abnormal changes such as interruption of electric power, open-phase, anomalous voltage, unbalanced voltage, negative-phase, overcurrent, and electric leakage in a power transmit and supply line of high and low voltage or special high voltage and high (low) voltage and, after compensating for the accident, for automatically re-supplying the power. The automatic power interruption and re-supply relay for an electric power line comprises: an anomalous voltage detector coupled to three phase buses for detecting unbalanced voltage and anomalous voltage of three phases; a phase detector for detecting an open-phase, negative-phase, and interruption of electric power; an overcurrent detector for detecting overcurrent on each electric power line; a zero current detector for detecting zero current on each electric power line; a breakdown detector for detecting an anomalous state of relays installed on the electric power lines and machinery installed in an industrial site; and a central processing unit (CPU) implemented with a microprocessor for comparing and analyzing information from the detectors with preselected reference values and determining and processing the anomalous state.

6 Claims, 2 Drawing Sheets

AUTOMATIC POWER INTERRUPTION AND RE-SUPPLY RELAY FOR AN ELECTRIC POWER LINE

BACKGROUND OF THE INVENTION

1. Field of the Invention

The present invention relates to a digital automatic power interruption and re-supply relay installed at a low voltage spot or a high voltage spot on a power transmit and supply line of high and low voltage or special high voltage and high (low) voltage, for performing detection and comparing operation to inform a state of an accident with voice and numerals and automatically operating a connected relay to interrupt power when there occur abnormal changes such as interruption of electric power, open-phase, anomalous voltage, unbalanced voltage, negative-phase, overcurrent, and electric leakage and, after compensating for the accident, for automatically re-supplying the power.

2. Description of Related Art

Conventionally, the electric power line is protected from interruption of electric power, undervoltage, overvoltage, or an open-phase occurring at the secondary coil of the electric power line, using a 3E relay, overvoltage relay, undervoltage relay, and phase open relay (POR) employing a dedicated potential transformer (PT). However, such relays do not operate in case of the anomalous voltage, unbalanced voltage, and open-phase at a primary coil and do not re-supply the power, so there is a problem of failing in supplying the power with good quality. To solve the problem, we filed Korean Pat. Appln. No. 97-7929 for an analog emergency protective device for the electric power line on Mar. 5, 1997, and the Korean Pat. Appln. No. 98-6196 for the same is filed as a national priority application on Feb. 28, 1998. The application is the prior art over the present invention.

The emergency protective device for the electric power line according to the prior art employs an analog mode and comprises: first to third detection converters for detecting currents flowing in three phases of the electric power line into DC ripples; a comparator for differentially amplifying the DC ripples and comparing the phases to provide a result in the form of a positive polar pulse or a negative polar pulse; a drive unit activated in response to the positive or negative polar pulse output, for generating a state output "1" or "0"; and a controller implemented with a central processing unit (CPU) that is a microprocessor for selectively outputting alarm, interruption, and re-supply instructions in response to the state output from the drive unit. Recently, the digital mode has been rapidly developed, so the conventional analog control parts are required to be digitalized in order to swiftly obtain accurate control results desired.

SUMMARY OF THE INVENTION

Accordingly, the present invention is directed to an automatic power interruption and re-supply relay for an electric power line that substantially obviates one or more of the limitations and disadvantages of the related art.

An objective of the present invention is to provide an automatic power interruption and re-supply relay employing the digital mode, wherein a CPU is formed in a multi-type, so an auxiliary CPU recognizes a value converted at each component part and transmits the value to a main CPU for converting the value to a digital value so as to accurately and swiftly performing desired control using various operation and time functions, thereby minimizing overall problems occurring due to the correlation between respective parts.

Another objective of the present invention is to provide an automatic power interruption and re-supply relay for increasing the number of conversions per unit time during analog to digital conversion to accurately estimate a transition and comparing the digitalized value with a digital value predetermined by a user, thereby facilitating modification and inquiry of preselected values previously entered and accurate determination of the value.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the automatic power interruption and re-supply relay for an electric power line comprises: an anomalous voltage detector coupled to three phase buses for detecting unbalanced voltage and anomalous voltage of three phases; a phase detector for detecting an open-phase, negative-phase, and interruption of electric power; an overcurrent detector for detecting overcurrent on each electric power line; a zero current detector for detecting zero current on each electric power line; a breakdown detector for detecting an anomalous state of relays installed on the electric power lines and machinery installed in an industrial site; and a central processing unit (CPU) implemented with a microprocessor for comparing and analyzing information from the detectors with preselected reference values and determining and processing the anomalous state.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Figure 1:
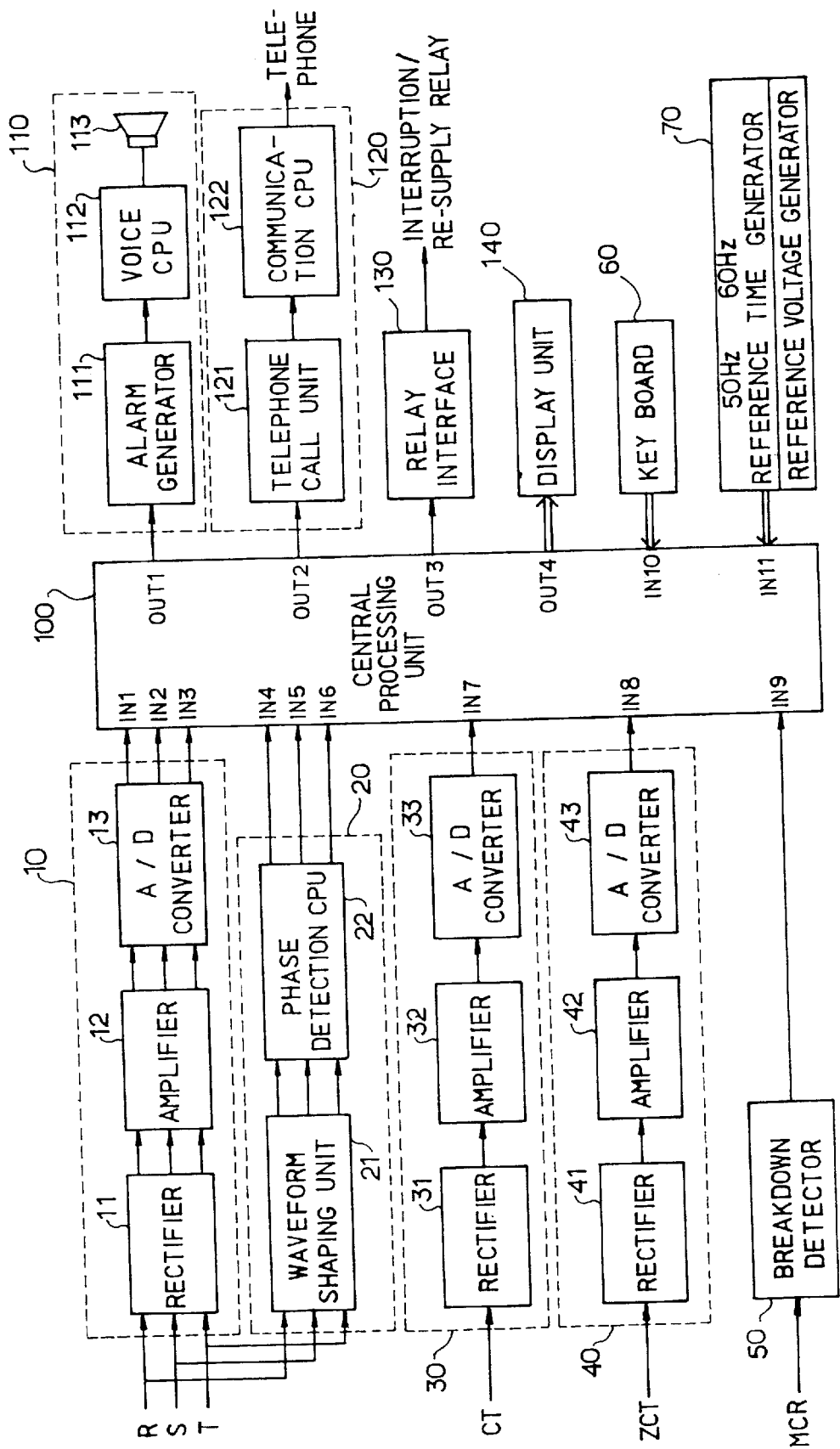
FIG. 1 is a block diagram showing the present invention.

Reference will now be made in detail to the preferred embodiments of the present invention, examples of which are illustrated in the accompanying drawings.

With reference to the accompanying drawings, specific configuration and effect of the present invention will now be described in detail.

The present invention comprises: anomalous voltage detector 10 coupled to three phase buses (R, S, T) for detecting unbalanced voltage and anomalous voltage from three phases; phase detector 20 for detecting an open-phase, negative phase, and interruption of electric power; overcurrent detector 30 for detecting overcurrent on each electric power line; zero current detector 40 for detecting zero current on each electric power line; breakdown detector 50 for detecting anomalous state of relays installed on the electric power lines and relay output contacts of machinery installed in an industrial site; CPU 100 implemented with a microprocessor for comparing and analyzing information from the anomalous voltage detector 10, phase detector 20, overcurrent detector 30, zero current detector 40, and breakdown detector 50 with reference values selected through key board 60 to determine an anomalous state and generating voice and telephone (call) signals for a corresponding anomalous state through alarm signal processor 110 and telephone (call) signal processor 120 while interrupting or re-activating the relay through relay interface 130 and displaying all operation states through display unit 140.

The anomalous voltage detector 10 comprises: rectifier 11 for rectifying the voltage of three phases passing through a limit circuit for limiting output voltage of the PT to 12V to provide a ripple of 120 Hz; amplifier 12 for amplifying the ripple; and A/D converter 13 for performing analog/digital (A/D) conversion with respect to the amplified ripple for two periods of 16.6 ms to provide an output. The phase detector 20 comprises: waveform shaping unit 21 for converting common frequency of the three phases to square waves of the same periods; and phase detection CPU 22 for counting the square waves to detect an open-phase and a negative-phase with respect to each phase. The overcurrent detector 30 comprises: rectifier 31 for rectifying an output of a current transformer (CT) installed onto the electric power line to provide a ripple of 120 Hz; amplifier 32 for amplifying the ripple; and A/D converter 13 for performing the A/D conversion with respect to the amplified ripple for two periods of 16.6 ms to provide an output. The zero current detector 40 comprises: rectifier 41 for rectifying an output of a zero current transformer (ZCT) installed onto the electric power line to provide a ripple of 120 Hz; amplifier 42 for amplifying the ripple; and A/D converter 43 for performing the A/D conversion with respect to the amplified ripple for two periods of 16.6 ms to provide an output. The breakdown detector 50 comprises a photo-coupler for deciphering output contacts of relays installed onto the electric power line and relays of machinery installed in an industrial site and a waveform shaping unit for waveform-shaping outputs of the photo-coupler and transmitting the waveform shaped outputs to the CPU 100 via a special data transmission circuit.

Each of these rectifiers 11, 31, and 41 comprises a diode and an operational amplifier. Each of the amplifiers 12, 32, and 42 comprises a variable resistance and an operational amplifier. Each of these A/D converters 13, 33, and 43 is implemented with an ADC 0804.

The key board 60 is a 4×5 matrix key, and reference time generator 70 is a crystal.

The CPU 100 comprises a main CPU, program ROM, data backup RAM, and buffer.

The alarm signal processor 110 comprises: alarm generator 111 that is a voice synthesizing chip for selection of a corresponding alarm message; and voice CPU 112 for generating the selected alarm message in the form of voice and activating a speaker. The telephone (call) signal processor 120 comprises: telephone call unit 121 for generating DTMF signals corresponding to detection of the anomalous state of the electric power line and automatic return in response to a telephone (call) signal; and communication CPU 122 for controlling drive of the telephone call unit 121 and transmitting a telephone number in the format of the voice or numeral message. The relay interface 130 comprises a relay and a relay driver circuit. The display unit 140 is implemented with a 20×4 TEXT. LCD.

Besides, a storage battery (not shown) is included as a power supply unit.

The following description concerns operation performed by such configuration.

The anomalous voltage detector 10 rectifies the voltage of the three phases (R, S, T) in an anomalous state to provide the ripple of 120 Hz at the rectifier 11, performs A/D conversion with respect to the ripple amplified at the amplifier 12 for the two periods of 16.6 ms at the A/D converter 13, and outputs a converted result to the CPU 100. A peak value and mean value of each phase voltage are obtained. After performing an operation with respect to obtained values, a result for each phase is compared with a preselected value to detect the unbalanced voltage. A mean of voltages of phases is obtained and the mean is compared with a preselected voltage to detect the anomalous voltage.

During the open-phase detection by the phase detector 20, the period of the common frequency 60 Hz of each phase (R. S. T) is 16.66 msec. This frequency is converted into square waves having the period of 16.66 msec by the waveform shaping unit 21 including the one-way photo-coupler. That is, the voltage less than about 1V is not permitted to pass according to a diode characteristic at a primary coil of the photo-coupler, and the voltage over 1V is saturated by a transistor at the secondary coil, so signals of about 0V to 1V are waveform-shaped into the square waves that are logic "LOW".

Figure 2:
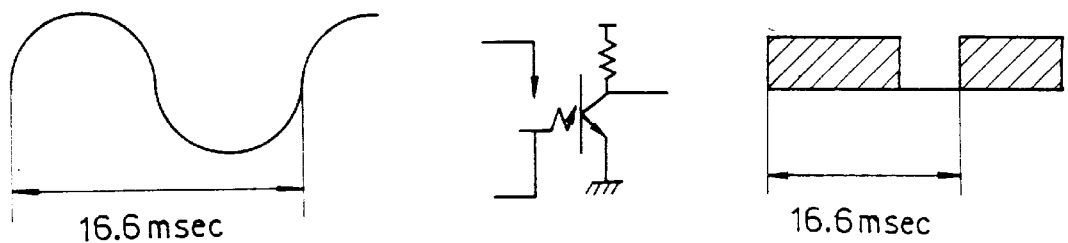
FIG. 2 shows states of three phase voltages that waveform has been shaped into square wave.
Figure 2:
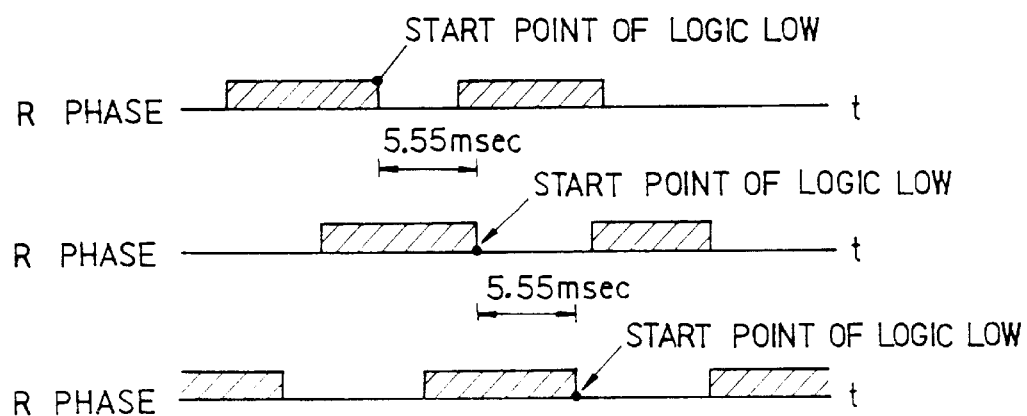

If the waveform shaping unit 21 is applied to the three phases, three square waves are generated as shown in FIG. 2 and start points of the logic "LOW" of the three square waves are regularly and sequentially appear at an interval of 5.55 ms.

The phase detecting CPU 22 counts reference times from one logic start point to the next logic start point by help of the reference time generator 70 that generates one pulse every 166.6 $\mu$sec. If the counted reference times reaches 100 with respect to the R phase, 166×100=16.6 msec, so the phase detecting CPU 22 determines that the R phase is normally supplied. If the counted value exceeds 100, the phase detecting CPU 22 determines that the R phase is the open-phase.

During negative phase detecting operation by the phase detector 20 when normal phases are supplied, counting for the S phase is started from the point of one third of 100 that is a normal counted value of the R phase by the phase detection CPU 22. Counting for the T phase is started from the point of one third of 100 that is a normal counted value of the S phase. Therefore, there is difference 33 between the counted value of the R phase and the counted value of the S phase. If the difference between the counted value of the S phase and the counted value of the T phase and the difference between the counted value of the T phase and the counted value of the S phase are respectively maintained at 33, it is determined that the phases are normally supplied.

If a negative-phase is supplied, differences between the phases related fall under other value than 33. The CPU 100 receives such information and performs a process corresponding to the input information. If one of three phases (R, S, T) is the open-phase, there occur decrease of average voltage, unbalanced voltage that is voltage deviation between the phases, anomalous voltage, and the negative-phase that the order of recognizing the phases is changed.

The overcurrent detector 30 rectifies the current of the CT installed on the electric power line to provide the ripple of 120 Hz at the rectifier 31, performs the A/D conversion with respect to the ripple amplified at the amplifier 32 for the two periods of 16.6 ms at the A/D converter 33, and outputs a converted result to the CPU 100. A peak value and a mean value of each phase voltage are obtained. After performing an operation with respect to the obtained values, a result for each phase is compared with a selected value to detect the overcurrent.

The zero current detector 40 rectifies the output of the ZCT installed on the electric power line to provide the ripple of 120 Hz at the rectifier 41, performs the A/D conversion with respect to the ripple amplified at the amplifier 42 for the two periods of 16.6 ms at the A/D converter 43, and outputs a converted result to the CPU 100. A peak value and a mean value of each phase voltage are obtained. After performing an operation with respect to the obtained values, a result for each phase is compared with a selected value to detect the zero current.

The A/D converters 13, 33, and 43 illustrated above accomplish fast sampling frequency, thereby allowing accurate decision on a change.

The breakdown detector 50 deciphers output contacts of relays installed on the electric power lines and relay output contacts of machinery installed in an industrial site with the photo-coupler, shapes waveform with the waveform shaping unit, and transmits its output to the CPU 100 via the special data transmission circuit. When the output contact of a relay is detected to be in an "ON" state during a selected time according to the output of the photo-coupler, abnormality and breakdown is determined.

The key board 60 is used by a user to set each reference value to be compared with an output of each detector. The reference time generator 70 generates frequency of 11.0592 MHz with the crystal to synchronize the frequency with 60 Hz.

The CPU 100 stores various preselected values from the program ROM and the key board 60 in the RAM and receives the voltage from the anomalous voltage detector 10, the open-phase and negative phase voltage from the phase detector 20, the current from the overcurrent detector 30, the output from the zero current detector 40, and the output from the breakdown detector 50. The CPU 100 in turn calculates peak values and mean values of the respective inputs and performs operations with respect to calculated values of respective phases. The CPU 100 then compares a result with respect to each phase with a corresponding preselected value to detect overvoltage, undervoltage, unbalanced voltage, open-phase voltage, negative phase voltage, overcurrent, or zero current and the state of the contact. When an anomalous state is decided according to the result of the detection, the CPU 100 outputs a corresponding voice code and preselected telephone (call) number to generate voice for alarm and transmit the decision of abnormality by way of the telephone (call) or numerals. The relay on the electric power line is then automatically turned "OFF" via the relay interface 130. This "OFF" state is maintained until the anomalous state is removed and the CPU 100 outputs a power re-supply signal after a predetermined time. When the CPU 100 outputs the re-supply signal, the power is automatically re-supplied to the electric power line. The CPU 100 outputs such overall operation states to the display unit 140 so as to display and record the operation states.

When various accidents, such as the open-phase, interruption of electric power, anomalous voltage, unbalanced voltage, and negative-phase occurring in a primary high voltage line and the overcurrent, electric leakage, and unbalanced voltage occurring in a secondary low voltage line, are detected through the detectors 10, 20, 30, 40, and 50, the content of each accident is identified at the time when a corresponding detected value reaches 60~70% of a corresponding preselected value and, after a predetermined time, a preliminary alarm is output by way of the voice and telephone (call) through the alarm processor 110 and the telephone (call) signal processor 120. When the detected value exceeds the preselected value, after a predetermined time, the identified accident content is output through corresponding voice and telephone (call) to alarm and simultaneously the power is automatically cut off. After the accident is compensated, the system is programmed to automatically re-supply the power without a special operation.

The alarm processor 110 selects a corresponding message from the voice synthesizing chip in response to the alarm signal from the CPU 100 and generates voice using the voice CPU 112 to activate the speaker.

The voice output can be transmitted to another place via a special branch circuit when necessary.

In response to a telephone (call) line of the CPU 100, the telephone (call) signal processor 120 generates DTMF signals corresponding to an anomalous state of the electric power line and an automatic return using the telephone call unit 121, and controls the drive of the telephone call unit 121 and transmits system and breakdown numbers in the form of numeral messages using the communication CPU 122.

The relay interface 130 operates the relay according to the process of the CPU 100. When the overcurrent or zero current is detected, the relay interface 130 maintains a cut off state of the relay. The automatic re-supply may be dangerous, so the relay interface 130 is manually operated to re-supply the power after the anomalous state is removed.

The display unit 140 recognizes in temporal and displays the number of times of occurrence and a frequency of occurrence of a present relay operation state by types and an event of power interruption or re-supply. When necessary, the display unit 140 records the above information.

As illustrated above, the present invention is installed at a low (high) voltage spot on the electric power line of high voltage (special high voltage) and low voltage (high voltage), for performing detection using detectors and swift decision using the CPU 100 to inform the state of an accident by way of voice, telephone (call), and numerals and automatically operate a connected relay to interrupt the power when there occur anomalous changes such as interruption of electric power, an open-phase, anomalous voltage, unbalanced voltage, a negative-phase, overcurrent, and electric leakage and, after compensating for the accident, for automatically re-supplying the power, thereby allowing the supply of the power with good quality. The present invention also displays the number of times of occurrence of each accident through the display unit allowing an operator to recognize a frequency of each accident, thereby allowing the operator to prevent various accidents related to safety.

Additionally, each detector in the present invention compares a calculated value with a reference digital value selected by the operator to detect a state in digital mode, thereby performing accurate decision and moreover facilitating modification and inquiry of the preselected values and minimizing a selection error.

According to the present invention, the content of an accident is identified at the time when a value detected with respect to the accident reaches 60~70% of a selected value corresponding to the presently determined anomalous state, and a preliminary alarm is generated by way of voice and telephone (call), enabling the operator to recognize an accident such as overcurrent or electric leakage in advance, thereby allowing the prevention of electric disaster.

It will be apparent to those skilled in the art that various modifications and variations can be made in an automatic power interruption and re-supply relay for an electric power line of the present invention without deviating from the spirit or scope of the invention. Thus, it is intended that the present invention covers the modifications and variations of this invention provided they come within the scope of the appended claims and their equivalents.

FIG. 1.

| | | |
|---|---|---|
| 11: RECTIFIER | 12: AMPLIFIER | 13: A/D CONVERTER |
| 21: WAVEFORM SHAPING UNIT | | 22: PHASE DETECTION CPU |
| 31: RECTIFIER | 32: AMPLIFIER | 33: A/D CONVERTER |
| 41: RECTIFIER | 42: AMPLIFIER | 43: A/D CONVERTER |

50: BREAKDOWN DETECTOR
60: KEY BOARD
70: REFERENCE TIME GENERATOR/REFERENCE VOLTAGE GENERATOR
100: CENTRAL PROCESSING UNIT
111: ALARM GENERATOR  112: VOICE CPU
121: TELEPHONE CALL UNIT  122: COMMUNICATION CPU TELEPHONE
130: RELAY INTERFACE  INTERRUPTION/RE-SUPPLY RELAY
140: DISPLAY UNIT

FIG. 2.

| | |
|---|---|
| R PHASE | START POINT OF LOGIC LOW |
| S PHASE | START POINT OF LOGIC LOW |
| T PHASE | START POINT OF LOGIC LOW |

What is claimed is:

1. An automatic power interruption and re-supply relay for an electric power line comprising:
    an anomalous voltage detector coupled to three phase buses for detecting unbalanced voltage and anomalous voltage of three phases;
    a phase detector for detecting an open-phase, negative-phase, and interruption of electric power;
    an overcurrent detector for detecting overcurrent on each electric power line;
    a zero current detector for detecting zero current on each electric power line;
    a breakdown detector for detecting an anomalous state of relays installed on the electric power lines and machinery installed in an industrial site; and
    a central processing unit (CPU) implemented with a microprocessor for comparing and analyzing information from said detectors with preselected reference values and determining and processing the anomalous state;
    wherein said anomalous voltage detector comprises:
        a rectifier for rectifying the voltage of the three phases to provide a ripple of 120 Hz;
        an amplifier for amplifying the ripple; and
        an analog/digital (A/D) converter for performing A/D conversion with respect to the amplified ripple for two periods of 16.6 ms to provide an output, and said phase detector comprises:
        a waveform shaping unit for converting common frequency of the three phases into square waves of the same periods; and
        a phase detection CPU for counting the square waves (converting a phase angle into a time) to detect the open-phase and the negative-phase with respect to each phase.

2. An automatic power interruption and re-supply relay for electric power line comprising:
    an anomalous voltage detector coupled to three phase buses for detecting unbalanced voltage and anomalous voltage of three phases;
    a phase detector for detecting an open-phase, negative-phase, and interruption of electric power;
    an overcurrent detector for detecting overcurrent on each electric power line;
    a zero current detector for detecting zero current on each electric power line;
    a breakdown detector for detecting an anomalous state of relays installed on the electric power lines and machinery installed in an industrial site; and
    a central processing unit (CPU) implemented with a microprocessor for comparing and analyzing information from said detectors with preselected reference values and determining and processing the anomalous state;
    wherein said overcurrent detector comprises:
        a rectifier for rectifying an output of a current transformer installed onto the electric power line to provide a ripple of 120 Hz;
        an amplifier for amplifying the ripple; and
        an A/D converter for performing A/D conversion with respect to the amplified ripple for two periods of 16.6 ms to provide an output.

3. An automatic power interruption and re-supply relay for electric power line comprising:
    an anomalous voltage detector coupled to three phase buses for detecting unbalanced voltage and anomalous voltage of three phases;
    a phase detector for detecting an open-phase, negative-phase, and interruption of electric power;
    an overcurrent detector for detecting overcurrent on each electric power line;
    a zero current detector for detecting zero current on each electric power line;
    a breakdown detector for detecting an anomalous state of relays installed on the electric power lines and machinery installed in an industrial site; and
    a central processing unit (CPU) implemented with a microprocessor for comparing and analyzing information from said detectors with preselected reference values and determining and processing the anomalous state;
    wherein said zero current detector comprises:
        a rectifier for rectifying an output of a zero current transformer installed onto the electric power line to provide a ripple of 120 Hz;
        an amplifier for amplifying the ripple; and
        an A/D converter for performing A/D conversion with respect to the amplified ripple for two periods of 16.6 ms to provide an output.

4. An automatic power interruption and re-supply relay for electric power line comprising:
    an anomalous voltage detector coupled to three phase buses for detecting unbalanced voltage and anomalous voltage of three phases;
    a phase detector for detecting an open-phase, negative-phase, and interruption of electric power;
    an overcurrent detector for detecting overcurrent on each electric power line;
    a zero current detector for detecting zero current on each electric power line;

a breakdown detector for detecting an anomalous state of relays installed on the electric power lines and machinery installed in an industrial site; and a central processing unit (CPU) implemented with a microprocessor for comparing and analyzing information from said detectors with preselected reference values and determining and processing the anomalous state;

wherein said breakdown detector comprises:

a photo-coupler for deciphering output contacts of relays installed onto the electric power line and machinery installed in an industrial site; and a waveform shaping unit for waveform-shaping outputs of said photo-coupler and transmitting the waveform-shaped outputs to said central processing unit via a special data transmission circuit.

5. An automatic power interruption and re-supply relay for electric power line comprising:

an anomalous voltage detector coupled to three phase buses for detecting unbalanced voltage and anomalous voltage of three phases;

a phase detector for detecting an open-phase, negative-phase, and interruption of electric power;

an overcurrent detector for detecting overcurrent on each electric power line;

a zero current detector for detecting zero current on each electric power line;

a breakdown detector for detecting an anomalous state of relays installed on the electric power lines and machinery installed in an industrial site; and a central processing unit (CPU) implemented with a microprocessor for comparing and analyzing information from said detectors with preselected reference values and determining and processing the anomalous state;

wherein said central processing unit identifies content of each accident at the time when each detected value from said detectors reaches 60~70% of a preselected value corresponding to the anomalous state and, after a predetermined time, outputs a preliminary alarm by way of voice and telephone (call) through an alarm processor and a telephone (call) signal processor, said central processing unit outputting the identified accident content after a predetermined time through corresponding voice and telephone (call) to alarm and automatically cutting off the power simultaneously when the detected value exceeds the preselected value and, after the accident is compensated, automatically re-supplying the power without a special operation.

6. The automatic power interruption and re-supply relay according to claim 5, wherein said alarm signal processor comprises:

an alarm generator that is a voice synthesizing chip for selection of a corresponding alarm message; and a voice CPU for generating the selected alarm message in the form of voice and activating a speaker, and said telephone (call) signal processor comprises:

a telephone call unit for generating DTMF signals corresponding to the detected anomalous state of the electric power line and automatic return in response to the telephone (call) signal; and a communication CPU for controlling drive of said telephone call unit and transmitting a telephone number in the format of a voice or numeral message.

* * * * *